(12) United States Patent
Krishnagi et al.

(10) Patent No.: US 12,154,115 B2
(45) Date of Patent: Nov. 26, 2024

(54) SYSTEM AND METHOD FOR AUTOMATED DATA DISCREPANCY DETECTION BETWEEN PRESET DATA AND INPUT DATA

(71) Applicant: JPMorgan Chase Bank, N.A., New York, NY (US)

(72) Inventors: Kumar Rao Krishnagi, Powell, OH (US); Sharmila Prakash, Columbus, OH (US); Jerome Joseph, Lewis Center, OH (US); Nalini Sreeram Boda, Lewis Center, OH (US); Vijay Kumar Perla, Westerville, OH (US); Mark Alan Wells, Columbus, OH (US); Matthew J Porter, Mechanicsburg, OH (US); Kritsakorn Chaumpanich, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 174 days.

(21) Appl. No.: 17/804,226

(22) Filed: May 26, 2022

(65) Prior Publication Data
US 2023/0385842 A1 Nov. 30, 2023

(51) Int. Cl.
*G06Q 20/40* (2012.01)
*G06Q 20/10* (2012.01)
*G06Q 20/38* (2012.01)

(52) U.S. Cl.
CPC ........... *G06Q 20/405* (2013.01); *G06Q 20/10* (2013.01); *G06Q 20/389* (2013.01)

(58) Field of Classification Search
CPC ............................................. G06Q 20/00-425
See application file for complete search history.

(56) References Cited

U.S. PATENT DOCUMENTS

| | | | |
|---|---|---|---|
| 10,032,153 B2* | 7/2018 | Luongo | G06Q 20/202 |
| 2010/0325048 A1* | 12/2010 | Carlson | G06Q 20/26 705/44 |
| 2015/0356548 A1* | 12/2015 | Luna-Rodriguez | G06Q 30/0278 705/39 |
| 2017/0255956 A1* | 9/2017 | Woodruff | G06Q 10/06398 |
| 2017/0308818 A1* | 10/2017 | Almishari | H04B 5/77 |
| 2018/0005203 A1* | 1/2018 | Grassadonia | G06Q 20/40 |
| 2018/0121922 A1* | 5/2018 | Zoldi | G06Q 20/4016 |
| 2020/0320503 A1* | 10/2020 | Mell | G06Q 20/204 |

(Continued)

*Primary Examiner* — Chenyuh Kuo
(74) *Attorney, Agent, or Firm* — GREENBLUM & BERNSTEIN, P.L.C.

(57) ABSTRACT

Various methods, apparatuses/systems, and media for automatically detecting discrepancy between preset data and input data are provided. A processor implements a platform and language agnostic smart data discrepancy detection module that automatically detects discrepancy between preset data and input data (i.e., larger than the preset data) during data processing of a commercial transaction involving a gratuity, particularly when a credit card payment is being made. The processor also implements an optimized processes of conducting a commercial transaction that includes a gratuity data based on user preferences that are obtainable from an application during execution thereof, and automatically alerts the user when data discrepancy is detected, i.e., when the gratuity data is more than preset gratuity data set by the user on the application.

20 Claims, 5 Drawing Sheets

(56) References Cited

U.S. PATENT DOCUMENTS

| | | | | |
|---|---|---|---|---|
| 2020/0364713 | A1* | 11/2020 | Douglas | G06Q 20/405 |
| 2021/0304027 | A1* | 9/2021 | Damodaran | G06N 3/08 |
| 2022/0058285 | A1* | 2/2022 | Trenholm | G06F 16/9024 |
| 2022/0383277 | A1* | 12/2022 | Abrons | G06Q 30/0207 |
| 2023/0244591 | A1* | 8/2023 | Sun | G06F 11/3495 |
| | | | | 718/104 |

\* cited by examiner

SYSTEM AND METHOD FOR AUTOMATED DATA DISCREPANCY DETECTION BETWEEN PRESET DATA AND INPUT DATA

BACKGROUND

1. Field of the Disclosure

This technology generally relates to data procession, more particularly, to systems for and methods of more implementing a platform and language agnostic smart data discrepancy detection module configured to automatically detect discrepancy between preset data and input data (i.e., larger than the preset data) during data processing.

2. Background Information

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In some commercial transactions, a gratuity (also known as a tip) is a sum that is voluntarily (but customarily) provided in recognition of a rendered service. The gratuity is in addition to the actual cost of the purchased goods and/or service. Examples of businesses, where tipping is common, include restaurants, bars, coffee shops, taxis, and hair salons. A conventional method of processing a commercial transaction involving a gratuity, such as settling the bill after a meal in a restaurant, may involve the following data processing steps.

A payment for the meal may be initially provided. This payment may be directed to a first sum data due for the meal itself, including any taxes and other required (i.e., non-optional) fees. Accordingly, an initial (usually itemized) receipt is provided to the customer that shows the first sum data, prior to any payment method being chosen. Payment can be made in any manner accepted by the merchant, with a credit card being a commonly used form of payment. The credit card may be charged (or at least preauthorized) for the first sum data to generate an intermediate receipt. The intermediate receipt includes a place for the customer to write in or otherwise indicate a second sum data representing the gratuity for the table service associated with the meal. In some cases, the customer will calculate the second sum data as a percentage (e.g., 20%) of the first sum data.

After any tip is indicated on the intermediate receipt, the customer signs the intermediate receipt to create a final receipt data that reflects the adjusted total being paid (i.e., the combination of the first sum data and the second sum data). In some instances, the merchant provides two copies of the intermediate receipt so that each may be transformed into a final receipt data, with one copy being provided for the customer and the other copy being provided for the merchant.

Merchant then requests, by utilizing a merchant's computing device, authorization of the final receipt data including the first sum data and the second sum data from a credit card processing unit (i.e., a credit card network) associated with the customer's credit card. In response, the issuing bank sends back a payment authorization (i.e., the credit card is valid, meets the amount limit, card holder's identity is correct, etc.) back to the merchant's computing device. Typically, at some later time, the first sum data and the second sum data are reconciled/settled (i.e., associated as belonging to the same transaction) by the credit card processing entity. Consequently, only the single reconciled charge will appear on the customer's statement (i.e., posted on customer's accounts/statements).

In the above example, mistakes can happen, but some can be costly. This problem is pertained to restaurant industry where customers have been reporting errors in dining expenses due to unusual tip data (i.e., large gratuity amount data) being mistakenly added to the final receipt. Some may be due to typographical errors, or misread info on the receipt data. These human errors are invisible to the customers until they are posted on their account/statements, leading to customer anxiety. By then, it is too late to correct the mistake leading to bad customer experience.

In view of the above, there is an unmet need for systems for and methods of automatically detecting discrepancy between preset data and input data (i.e., larger than the preset data) during data processing of a commercial transaction involving a gratuity, particularly when a credit card payment is being made.

SUMMARY

The present disclosure, through one or more of its various aspects, embodiments, and/or specific features or sub-components, provides, among others, various systems, servers, devices, methods, media, programs, and platforms for implementing a platform and language agnostic smart data discrepancy detection module configured to automatically detect discrepancy between preset data and input data (i.e., larger than the preset data) during data processing of a commercial transaction involving a gratuity, particularly when a credit card payment is being made. The various aspects, embodiments, features, and/or sub-components provide optimized processes of conducting a commercial transaction that includes a gratuity data based on user preferences that are obtainable from an application during execution thereof, and automatically alerting the user when data discrepancy is detected, i.e., when the gratuity data is more than preset gratuity data set by the user on the application.

According to an aspect of the present disclosure, a method for automatically detecting data discrepancy during data processing by utilizing one or more processors and one or more memories is disclosed. The method may include: establishing a communication link between an application and a database via a communication interface, wherein the database stores user profile data, user history data in connection with a card transaction data, and wherein the card transaction data includes a final data that includes a first part data associated with rendering a service by a merchant to the user and a second part data that represents data that is voluntarily provided by the user in recognition of the rendered service; setting a desired threshold data value based on receiving user input via the application for preauthorizing the second part data of the final data; storing the desired threshold data onto the database; implementing a data processing algorithm that includes: receiving input data via a merchant computing device to process the final data associated with the card transaction; calling a first application programming interface (API) to fetch the desired threshold data from the database; comparing the second part data of the final data with the desired threshold data; automatically authorizing the card transaction when it is determined that the second part data is equal to or below the desired threshold data; and automatically transmitting an alert signal to the application to receive user input to authorize or deny the card transaction when it is determined that the second part data is above the desired threshold data.

According to a further aspect of the present disclosure, in automatically transmitting the alert signal, the method may further include: calling a second API; transmitting, in response to the second API, an electronic notification to the application indicating that the second part data exceeded the desired threshold data; and displaying the electronic notification onto a graphical user interface (GUI) to receive user input for denying or authorizing the card transaction.

According to another aspect of the present disclosure, the first part data of the final data may be a currency amount associated with rendering the service to the user and the second part data may represent a percentage (%) amount of the currency amount of the first part data that is voluntarily provided by the user in recognition of the rendered service.

According to yet another aspect of the present disclosure, the desired threshold data may be set to be 30% of the currency amount associated with the first part data.

According to an aspect of the present disclosure, the method may further include: receiving user input data via the application for declining the card transaction in response to the alert signal indicating that the second part data is above the desired threshold data.

According to a further aspect of the present disclosure, the method may further include: receiving user input data via the application for authorizing the card transaction in response to the alert signal indicating that the second part data is above the desired threshold data; and storing the user input data onto the database indicating that the user authorized the second part data, although it exceeded the desired threshold data, for this particular card transaction with this particular merchant.

According to another aspect of the present disclosure, the method may further include: creating a machine learning model based on the user profile data and the user history data in connection with the card transaction data; and training the machine learning model with the user input data indicating that the user authorized the second part data, although it exceeded the desired threshold data, for this particular card transaction with this particular merchant.

According to yet another aspect of the present disclosure, the method may further include: receiving a second input data via the merchant computing device to process a second final data that includes the first part data and the second part data associated with a second card transaction involving this particular merchant; implementing the trained machine learning model; automatically authorizing, in response to implementing the trained machine learning model, the second card transaction although the second part data exceeded the desired threshold data; and retraining the machine learning model with transaction history data associated with the second card transaction.

According to an aspect of the present disclosure, the method may further include: receiving, by a card issuing bank computing device, a batch of authorized transactions from the merchant computing device for a plurality of card transactions associated with a plurality of users via a card network; executing the data processing algorithm for each authorized transaction of the batch of authorized transactions; and implementing a settlement data processing algorithm, in response to executing the data processing algorithm, wherein the settlement data processing algorithm settles the plurality of card transactions to issue payments to the merchant via the card issuing bank computing device.

According to a further aspect of the present disclosure, the method may further include: receiving, by a card issuing bank computing device, the authorized card transaction from the merchant computing device via a card network; executing the data processing algorithm in real-time for the authorized card transaction; and implementing a settlement data processing algorithm in real-time, in response to executing the data processing algorithm, wherein the settlement data processing algorithm settles the card transaction in real-time to issue payment to the merchant via the card issuing bank computing device.

According to an aspect of the present disclosure, a system for automatically detecting data discrepancy during data processing is disclosed. The system may include: a processor; and a memory operatively connected to the processor via a communication interface, the memory storing computer readable instructions, when executed, causes the processor to: establish a communication link between an application and a database via a communication interface, wherein the database stores user profile data, user history data in connection with a card transaction data, and wherein the card transaction data includes a final data that includes a first part data associated with rendering a service by a merchant to the user and a second part data that represents data that is voluntarily provided by the user in recognition of the rendered service; set a desired threshold data value based on receiving user input via the application for preauthorizing the second part data of the final data; store the desired threshold data onto the database; implement a data processing algorithm that includes: receive input data via a merchant computing device to process the final data associated with the card transaction; call a first API to fetch the desired threshold data from the database; compare the second part data of the final data with the desired threshold data; automatically authorize the card transaction when it is determined that the second part data is equal to or below the desired threshold data; and automatically transmit an alert signal to the application to receive user input to authorize or deny the card transaction when it is determined that the second part data is above the desired threshold data.

According to a further aspect of the present disclosure, in automatically transmitting the alert signal, the processor may be further configured to: call a second API; transmit, in response to the second API, an electronic notification to the application indicating that the second part data exceeded the desired threshold data; and displaying the electronic notification onto a GUI to receive user input for denying or authorizing the card transaction.

According to an aspect of the present disclosure, the processor may be further configured to: receive user input data via the application for declining the card transaction in response to the alert signal indicating that the second part data is above the desired threshold data.

According to a further aspect of the present disclosure, the processor may be further configured to: receive user input data via the application for authorizing the card transaction in response to the alert signal indicating that the second part data is above the desired threshold data; and store the user input data onto the database indicating that the user authorized the second part data, although it exceeded the desired threshold data, for this particular card transaction with this particular merchant.

According to another aspect of the present disclosure, the processor may be further configured to: create a machine learning model based on the user profile data and the user history data in connection with the card transaction data; and train the machine learning model with the user input data indicating that the user authorized the second part data, although it exceeded the desired threshold data, for this particular card transaction with this particular merchant.

According to yet another aspect of the present disclosure, the processor may be further configured to: receive a second input data via the merchant computing device to process a second final data that includes the first part data and the second part data associated with a second card transaction involving this particular merchant; implement the trained machine learning model; automatically authorize, in response to implementing the trained machine learning model, the second card transaction although the second part data exceeded the desired threshold data; and retrain the machine learning model with transaction history data associated with the second card transaction.

According to an aspect of the present disclosure, the processor may be further configured to: receive, by a card issuing bank computing device, a batch of authorized transactions from the merchant computing device for a plurality of card transactions associated with a plurality of users via a card network; execute the data processing algorithm for each authorized transaction of the batch of authorized transactions; and implement a settlement data processing algorithm, in response to executing the data processing algorithm, wherein the settlement data processing algorithm settles the plurality of card transactions to issue payments to the merchant via the card issuing bank computing device.

According to a further aspect of the present disclosure, the processor may be further configured to: receive, by a card issuing bank computing device, the authorized card transaction from the merchant computing device via a card network; execute the data processing algorithm in real-time for the authorized card transaction; and implement a settlement data processing algorithm in real-time, in response to executing the data processing algorithm, wherein the settlement data processing algorithm settles the card transaction in real-time to issue payment to the merchant via the card issuing bank computing device.

According to an aspect of the present disclosure, a non-transitory computer readable medium configured to store instructions for automatically detecting data discrepancy during data processing by utilizing one or more processors and one or more memories is disclosed. The instructions, when executed, may cause a processor to perform the following: establishing a communication link between an application and a database via a communication interface, wherein the database stores user profile data, user history data in connection with a card transaction data, and wherein the card transaction data includes a final data that includes a first part data associated with rendering a service by a merchant to the user and a second part data that represents data that is voluntarily provided by the user in recognition of the rendered service; setting a desired threshold data value based on receiving user input via the application for preauthorizing the second part data of the final data; storing the desired threshold data onto the database; implementing a data processing algorithm that includes: receiving input data via a merchant computing device to process the final data associated with the card transaction; calling a first API to fetch the desired threshold data from the database; comparing the second part data of the final data with the desired threshold data; automatically authorizing the card transaction when it is determined that the second part data is equal to or below the desired threshold data; and automatically transmitting an alert signal to the application to receive user input to authorize or deny the card transaction when it is determined that the second part data is above the desired threshold data.

According to a further aspect of the present disclosure, in automatically transmitting the alert signal, the instructions, when executed, may cause the processor to further perform the following: calling a second API; transmitting, in response to the second API, an electronic notification to the application indicating that the second part data exceeded the desired threshold data; and displaying the electronic notification onto a GUI to receive user input for denying or authorizing the card transaction.

According to an aspect of the present disclosure, the instructions, when executed, may cause the processor to further perform the following: receiving user input data via the application for declining the card transaction in response to the alert signal indicating that the second part data is above the desired threshold data.

According to a further aspect of the present disclosure, the instructions, when executed, may cause the processor to further perform the following: receiving user input data via the application for authorizing the card transaction in response to the alert signal indicating that the second part data is above the desired threshold data; and storing the user input data onto the database indicating that the user authorized the second part data, although it exceeded the desired threshold data, for this particular card transaction with this particular merchant.

According to another aspect of the present disclosure, the instructions, when executed, may cause the processor to further perform the following: creating a machine learning model based on the user profile data and the user history data in connection with the card transaction data; and training the machine learning model with the user input data indicating that the user authorized the second part data, although it exceeded the desired threshold data, for this particular card transaction with this particular merchant.

According to yet another aspect of the present disclosure, the instructions, when executed, may cause the processor to further perform the following: receiving a second input data via the merchant computing device to process a second final data that includes the first part data and the second part data associated with a second card transaction involving this particular merchant; implementing the trained machine learning model; automatically authorizing, in response to implementing the trained machine learning model, the second card transaction although the second part data exceeded the desired threshold data; and retraining the machine learning model with transaction history data associated with the second card transaction.

According to an aspect of the present disclosure, the instructions, when executed, may cause the processor to further perform the following: receiving, by a card issuing bank computing device, a batch of authorized transactions from the merchant computing device for a plurality of card transactions associated with a plurality of users via a card network; executing the data processing algorithm for each authorized transaction of the batch of authorized transactions; and implementing a settlement data processing algorithm, in response to executing the data processing algorithm, wherein the settlement data processing algorithm settles the plurality of card transactions to issue payments to the merchant via the card issuing bank computing device.

According to a further aspect of the present disclosure, the instructions, when executed, may cause the processor to further perform the following: receiving, by a card issuing bank computing device, the authorized card transaction from the merchant computing device via a card network; executing the data processing algorithm in real-time for the authorized card transaction; and implementing a settlement data processing algorithm in real-time, in response to executing the data processing algorithm, wherein the settlement data processing algorithm settles the card transaction in real-time to issue payment to the merchant via the card issuing bank computing device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
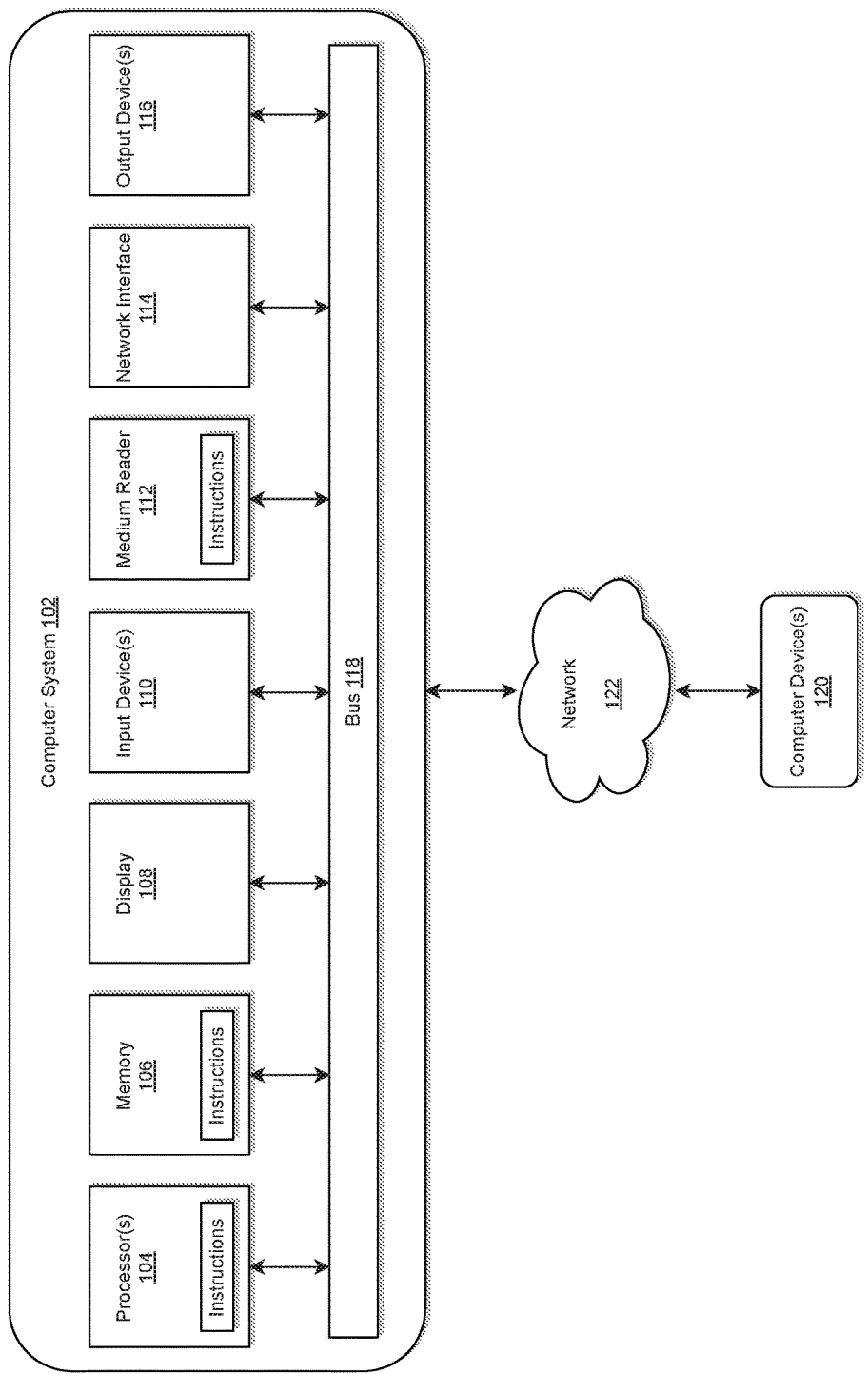
FIG. 1 illustrates a computer system for implementing a platform and language agnostic smart data discrepancy detection module configured to automatically detect discrepancy between preset data and input data (i.e., larger than the preset data) during data processing in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic smart data discrepancy detection module configured to automatically detect discrepancy between preset data and input data (i.e., larger than the preset data) during data processing in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
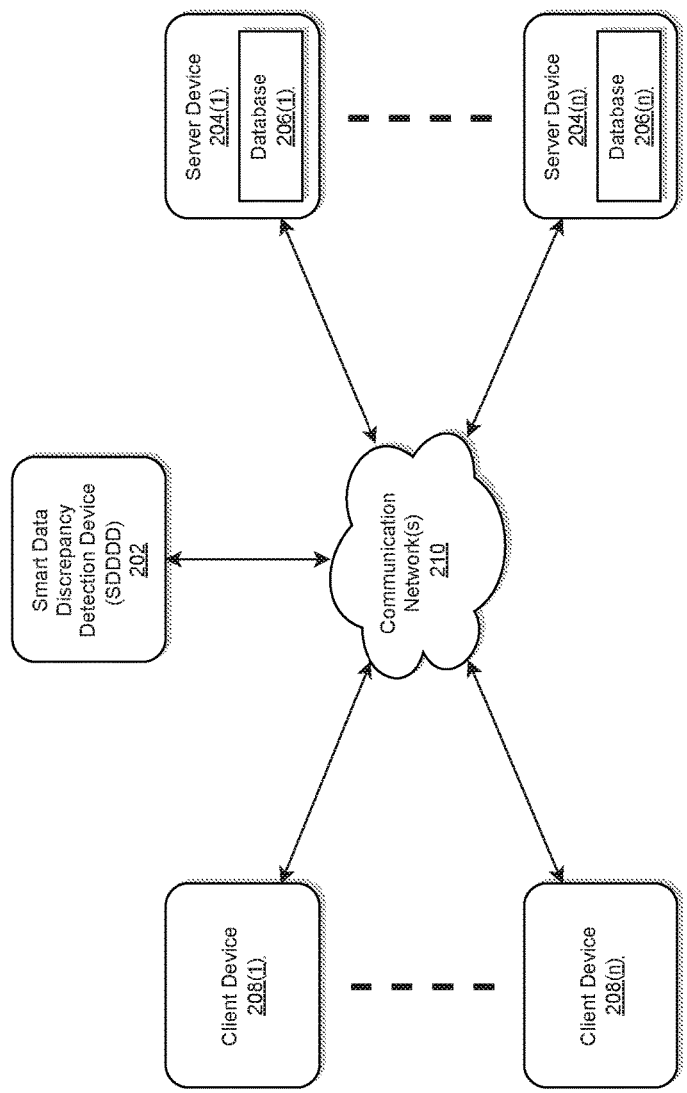
FIG. 2 illustrates an exemplary diagram of a network environment with a platform and language agnostic smart data discrepancy detection device in accordance with an exemplary embodiment.

Referring to FIG. 2, a schematic of an exemplary network environment 200 for implementing a platform and language agnostic smart data discrepancy detection device (SDDDD) of the instant disclosure is illustrated.

According to exemplary embodiments, the above-described problems associated with conventional tools may be overcome by implementing a SDDDD 202 as illustrated in FIG. 2 that may implement a platform and language agnostic smart data discrepancy detection module configured to automatically detect discrepancy between preset data and input data (i.e., larger than the preset data) during data processing of a commercial transaction involving a gratuity, particularly when a credit card payment is being made, but the disclosure is not limited thereto. The various aspects, embodiments, features, and/or sub-components provide optimized processes that are implemented by the SDDDD 202 for conducting a commercial transaction that includes a gratuity data based on user preferences that are obtainable from an application during execution thereof, and automatically alerting the user when data discrepancy is detected, i.e., when the gratuity data is more than preset gratuity data set by the user on the application, but the disclosure is not limited thereto.

The SDDDD 202 may be the same or similar to the computer system 102 as described with respect to FIG. 1.

The SDDDD 202 may store one or more applications that can include executable instructions that, when executed by the SDDDD 202, cause the SDDDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SDDDD 202 itself, may be located in virtual server(s) running in a cloud-based computing environment rather than being tied to one or more specific physical network computing devices. Also, the application(s) may be running in one or more virtual machines (VMs) executing on the SDDDD 202. Additionally, in one or more embodiments of this technology, virtual machine(s) running on the SDDDD 202 may be managed or supervised by a hypervisor.

In the network environment 200 of FIG. 2, the SDDDD 202 is coupled to a plurality of server devices 204(1)-204(n) that hosts a plurality of databases 206(1)-206(n), and also to a plurality of client devices 208(1)-208(n) via communication network(s) 210. A communication interface of the SDDDD 202, such as the network interface 114 of the computer system 102 of FIG. 1, operatively couples and communicates between the SDDDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDDDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SDDDD 202 may be a standalone device or integrated with one or more other devices or apparatuses, such as one or more of the server devices 204(1)-204(n), for example. In one particular example, the SDDDD 202 may be hosted by one of the server devices 204(1)-204(n), and other arrangements are also possible. Moreover, one or more of the devices of the SDDDD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SDDDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SDDDD 202 as illustrated in FIG. 2 that may implement a platform and language agnostic password-less authentication module configured to utilize digital identification information (i.e., digital driving license) of a user, instead of using any user's password/passcode, to authenticate the user to access the application, but the disclosure is not limited thereto.

The client devices 208(1)-208(n) may run interface applications, such as standard web browsers or standalone client applications, which may provide an interface to communicate with the SDDDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SDDDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDDDD 202, the server devices 204(1)-204(n), or the client devices 208(1)-208(n), for example, may be configured to operate as virtual instances on the same physical machine. For example, one or more of the SDDDD 202, the server devices 204(1)-204(n), or the client devices 208(1)-208(n) may operate on the same physical device rather than as separate devices communicating through communication network(s) 210. Additionally, there may be more or fewer SDDDDs 202, server devices 204(1)-204(n), or client devices 208(1)-208(n) than illustrated in FIG. 2. According to exemplary embodiments, the SDDDD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
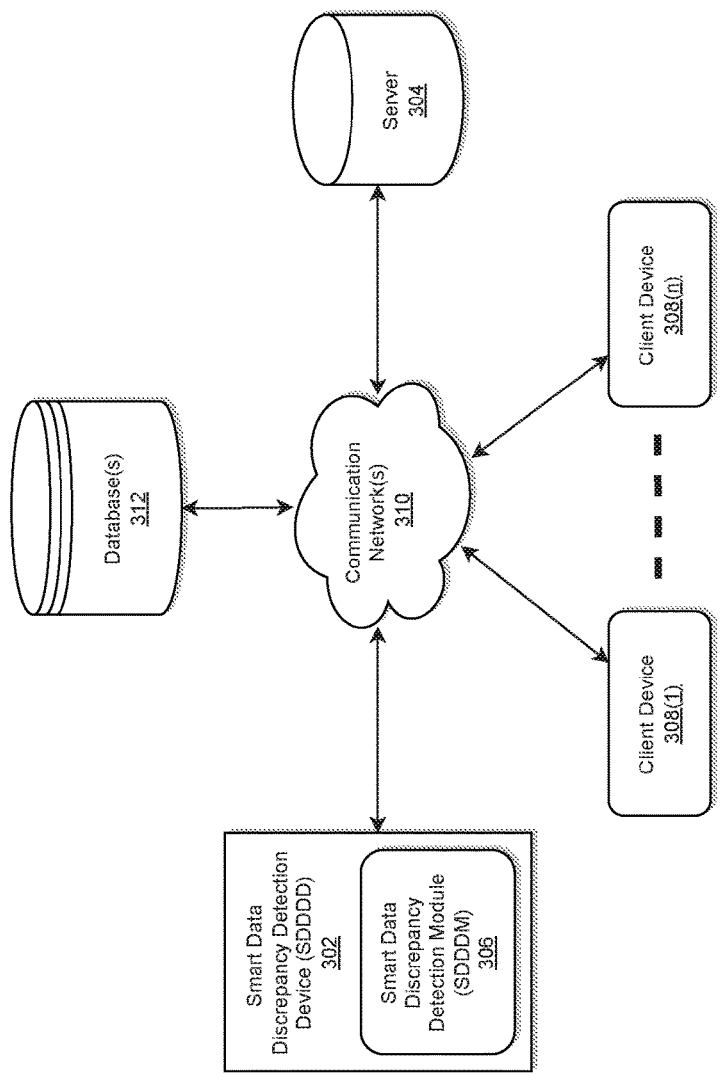
FIG. 3 illustrates a system diagram for implementing a platform and language agnostic smart data discrepancy detection device having a platform and language agnostic smart data discrepancy detection module in accordance with an exemplary embodiment.

FIG. 3 illustrates a system diagram for implementing a platform and language agnostic SDDDD having a platform and language agnostic smart data discrepancy detection module (SDDDM) in accordance with an exemplary embodiment.

As illustrated in FIG. 3, the system 300 may include a SDDDD 302 within which an SDDDM 306 is embedded, a server 304, a database(s) 312, a plurality of client devices 308(1) . . . 308(n), and a communication network 310. The database(s) 312 may be also referred to as a configuration and log database; and external or internal database, etc.

According to exemplary embodiments, the SDDDD 302 including the SDDDM 306 may be connected to the server 304, and the database(s) 312 via the communication network 310. The SDDDD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the SDDDD 302 is described and shown in FIG. 3 as including the SDDDM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the SDDDM 306 may be configured to receive real-time feed of data from the plurality of client devices 308(1) . . . 308(n) via the communication network 310.

As will be described below, the SDDDM 306 may be configured to establish a communication link between an application and a database 312 via a communication interface (i.e., communication network 310), wherein the database 312 stores user profile data, user history data in connection with a card transaction data, and wherein the card transaction data includes a final data that includes a first part data associated with rendering a service by a merchant to the user and a second part data that represents data that is voluntarily provided by the user in recognition of the rendered service; set a desired threshold data value based on receiving user input via the application for preauthorizing the second part data of the final data; store the desired threshold data onto the database; implement a data processing algorithm that includes: receive input data via a merchant computing device to process the final data associated with the card transaction; call a first API to fetch the desired threshold data from the database; compare the second part data of the final data with the desired threshold data; automatically authorize the card transaction when it is determined that the second part data is equal to or below the desired threshold data; and automatically transmit an alert signal to the application to receive user input to authorize or deny the card transaction when it is determined that the second part data is above the desired threshold data, but the disclosure is not limited thereto.

The plurality of client devices 308(1) . . . 308(n) are illustrated as being in communication with the SDDDD 302. In this regard, the plurality of client devices 308(1) . . . 308(n) may be "clients" of the SDDDD 302 and are described herein as such. Nevertheless, it is to be known and understood that the plurality of client devices 308(1) . . . 308(n) need not necessarily be "clients" of the SDDDD 302, or any entity described in association therewith herein. Any additional or alternative relationship may exist between either or both of the plurality of client devices 308(1) . . . 308(n) and the SDDDD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SDDDD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SDDDD 302 may be the same or similar to the SDDDD 202 as described with respect to FIG. 2, including any features or combination of features described with respect thereto.

Figure 4:
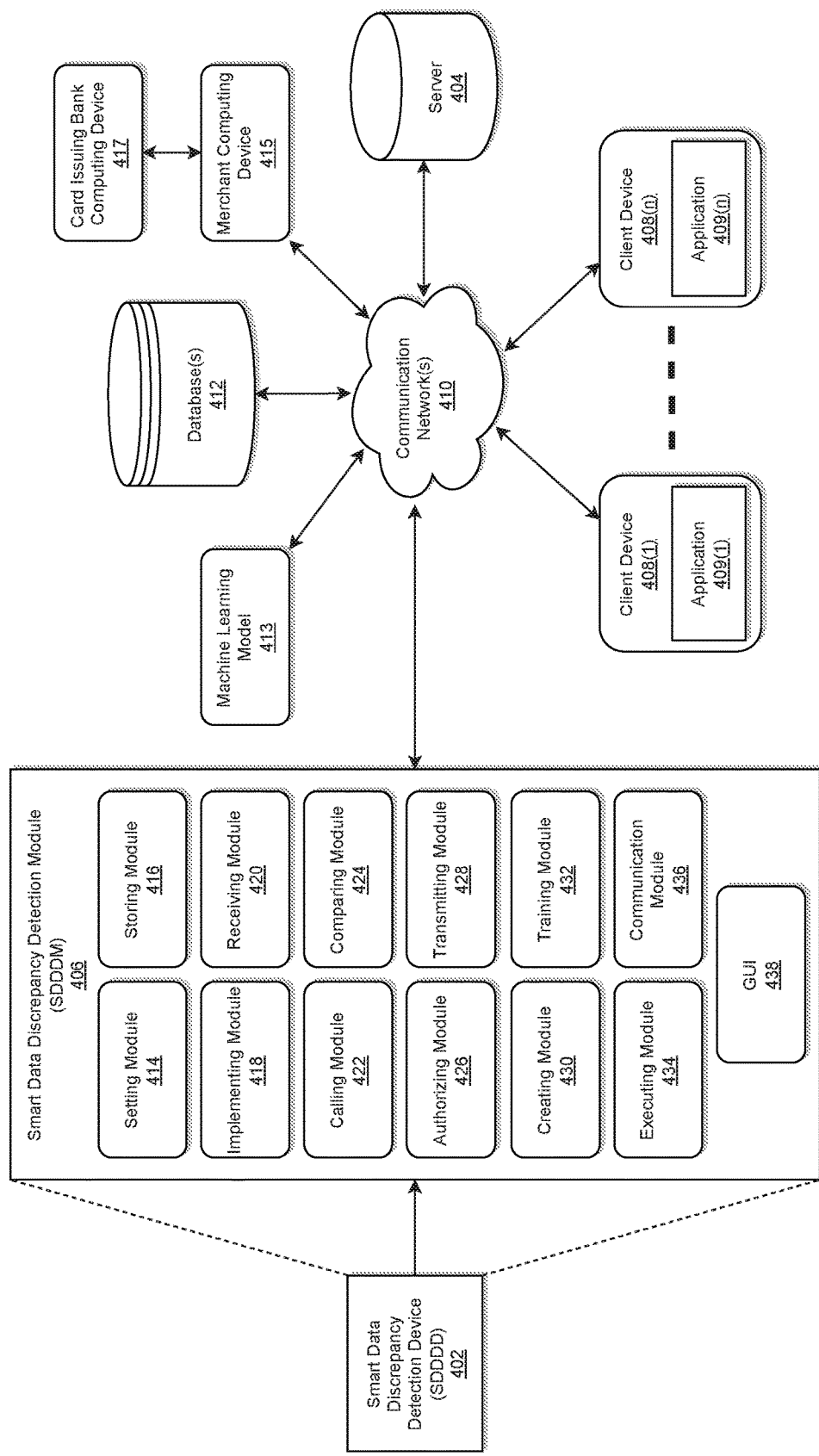
FIG. 4 illustrates a system diagram for implementing a platform and language agnostic smart data discrepancy detection module of FIG. 3 in accordance with an exemplary embodiment.

FIG. 4 illustrates a system diagram for implementing a platform and language agnostic SDDDM of FIG. 3 in accordance with an exemplary embodiment.

According to exemplary embodiments, the system 400 may include a platform and language agnostic SDDDD 402 within which a SDDDM 406 is embedded, a server 404, database(s) 412, a machine learning model 413, a merchant computing device 415 and a communication network 410.

According to exemplary embodiments, the SDDDD 402 including the SDDDM 406 may be connected to the server 404, the database(s) 412, machine learning model 413, and the merchant computing device 415 via the communication network 410. The SDDDD 402 may also be connected to the plurality of client devices 408(1)-408(n) via the communication network 410, but the disclosure is not limited thereto. According to exemplary embodiments, the merchant computing device 415 may also be bidirectionally connected to a card issuing bank computing device 417 to exchange data via the communication network 310. According to exemplary embodiments, each of the client device 408(1)-408(n) may include an application (Web application) 409, respectively, (i.e., 409(1)-409(n)) embedded therein. The SDDDM 406, the server 404, the plurality of client devices 408(1)-408(n), the database(s) 412, the communication network 410 as illustrated in FIG. 4 may be the same or similar to the SDDDM 306, the server 304, the plurality of client devices 308(1)-308(n), the database(s) 312, the communication network 310, respectively, as illustrated in FIG. 3.

According to exemplary embodiments, as illustrated in FIG. 4, the SDDDM 406 may include a setting module 414, a storing module 416, an implementing module 418, a receiving module 420, a calling module 422, a comparing module 424, an authorizing module 426, a transmitting module 428, a creating module 430, a training module 432, an executing module 434, a communication module 436, and a GUI 438.

According to exemplary embodiments, each of the storing module 414, receiving module 416, extracting module 418, calling module 420, comparing module 422, validating module 424, creating module 426, transmitting module 428, updating module 430, blocking module 432, and the communication module 434 of the SDDDM 406 as illustrated in FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the setting module 414, storing module 416, implementing module 418, receiving module 420, calling module 422, comparing module 424, authorizing module 426, transmitting module 428, creating module 430, training module 432, executing module 434, and the communication module 436 of the SDDDM 406 as illustrated in FIG. 4 may be implemented by microprocessors or similar, and may be programmed using software (e.g., microcode) to perform various functions discussed herein and may optionally be driven by firmware and/or software.

Alternatively, according to exemplary embodiments, each of the setting module 414, storing module 416, implementing module 418, receiving module 420, calling module 422, comparing module 424, authorizing module 426, transmitting module 428, creating module 430, training module 432, executing module 434, and the communication module 436 of the SDDDM 406 as illustrated in FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the setting module 414, storing module 416, implementing module 418, receiving module 420, calling module 422, comparing module 424, authorizing module 426, transmitting module 428, creating module 430, training module 432, executing module 434, and the communication module 436 of the SDDDM 406 as illustrated in FIG. 4 may be called via corresponding API.

The process may be executed via the communication module 436 and the communication network 410, which may comprise plural networks as described above. For example, in an exemplary embodiment, the various components of the SDDDM 406 may communicate with the server 404, the database(s) 412 via the communication module 436 and the communication network 410. Of course, these embodiments are merely exemplary and are not limiting or exhaustive.

According to exemplary embodiments, the communication network 410 and the communication module 436 may be configured to establish a link among the database(s) 412, the client devices 408(1)-408(n), machine learning model 413, the merchant computing device 415, and the SDDDM 406.

According to exemplary embodiments, a digital wallet application may be executed on the computing device (i.e., client device 408(1)-408(n)). The client device 408(1)-408(n) may be, for example, a mobile device (such as a smart phone, a tablet, a notebook, personal digital assistant, a dedicated wallet device, a wearable computing device, or any other portable device capable of sending and receiving messages over a network). The client device 408(1)-408(n) may also be devices integrated into the Internet of Things, such as a smart home or devices within the home. Within the digital wallet is information about different available digital identification documents of a user.

According to exemplary embodiments, the communication module 436 may be configured to establish a communication link between an application (i.e., 409(1)) and the database 412 via the communication network 410. The database 412 may store user profile data, user history data in connection with a card transaction data, and the card transaction data may include a final data that includes a first part data associated with rendering a service by a merchant to the user and a second part data that represents data that is voluntarily provided by the user in recognition of the rendered service.

According to exemplary embodiments, the setting module 414 may be configured to set a desired threshold data value based on receiving user input via the application for preauthorizing the second part data of the final data. According to exemplary embodiments, the first part data of the final data may be a currency amount associated with rendering the service to the user and the second part data may represent a percentage (%) amount of the currency amount of the first part data that is voluntarily provided by the user in recognition of the rendered service. According to exemplary embodiments, the desired threshold data may be set to be 30% of the currency amount associated with the first part data, but the disclosure is not limited thereto. The desired threshold data may be set to be any configured percentage (%) of the currency amount associated with the first part data, e.g., 10%, 12%, 15%, 18%, 20%, 22%, 25%, 30%, 35%, etc., but the disclosure is not limited thereto.

According to exemplary embodiments, the first part data may indicate currency amount corresponding to provide service to a user (i.e., client) and the second part data may indicate gratuity amount corresponding to the provided service. The gratuity is in addition to the actual cost of the purchased goods and/or service. Examples of businesses, where tipping is common, include restaurants, bars, coffee shops, taxis, and hair salons.

According to exemplary embodiments, the storing module 416 may be configured to store the desired threshold data onto the database 412. The implementing module 418 may be configured to implement a data processing algorithm that includes: receive input data, by utilizing the receiving module 420 via the merchant computing device 415 to process the final data associated with the card transaction; call a first API (i.e., CPU API), by utilizing the calling module 422, to fetch the desired threshold data from the database 412; compare, by utilizing the comparing module 424, the second part data of the final data with the desired threshold data; automatically authorize, by utilizing the authorizing module 426, the card transaction when it is determined that the second part data is equal to or below the desired threshold data; and automatically transmit, by utilizing the transmitting module 428, an alert signal to the application to receive user input to authorize or deny the card transaction when it is determined that the second part data is above the desired threshold data.

According to exemplary embodiments, in automatically transmitting the alert signal, the calling module 430 calls a second API; the transmitting module 428 transmits, in response to the second API (i.e., by calling an alert API), an electronic notification to the application (i.e., 409(1)) indicating that the second part data exceeded the desired threshold data; and the application displays the electronic notification onto the GUI 438 to receive user input for denying or authorizing the card transaction. Although the GUI 438 is illustrated to be embedded within the SDDDM 406, the GUI 438 may also be embedded within each of the client devices 408(1)-408(n).

According to exemplary embodiments, the receiving module 420 may be configured to receive user input data via the application 409(1) for declining the card transaction in response to the alert signal indicating that the second part data is above the desired threshold data.

According to exemplary embodiments, the receiving module 420 may be configured to receive user input data via the application 409(1) for authorizing the card transaction in response to the alert signal indicating that the second part data is above the desired threshold data; and the storing module 416 may be configured to store the user input data onto the database 412 indicating that the user authorized the second part data, although it exceeded the desired threshold data, for this particular card transaction with this particular merchant.

According to exemplary embodiments, the creating module 430 may be configured to create a machine learning model 413 based on the user profile data and the user history data in connection with the card transaction data; and the training module 432 may be configured to train the machine learning model 413 with the user input data indicating that the user authorized the second part data, although it exceeded the desired threshold data, for this particular card transaction with this particular merchant.

According to exemplary embodiments, the receiving module 420 may be configured to receive a second input data via the merchant computing device to process a second final data that includes the first part data and the second part data associated with a second card transaction involving this particular merchant. The implementing module 418 may be configured to implement the trained machine learning model 413. The authorizing module 426 may be configured to automatically authorize, in response to implementing the trained machine learning model 413, the second card transaction although the second part data exceeded the desired threshold data. The training module 432 may be further configured to retrain the machine learning model 413 with transaction history data associated with the second card transaction.

According to exemplary embodiments, receiving module 420 may be configured to receive, by the card issuing bank computing device 417, a batch of authorized transactions from the merchant computing device 415 for a plurality of card transactions associated with a plurality of users via a card network. The executing module 434 may be configured to execute the data processing algorithm for each authorized transaction of the batch of authorized transactions. The implementing module 418 may be configured to implement a settlement data processing algorithm, in response to executing the data processing algorithm, wherein the settlement data processing algorithm settles the plurality of card transactions to issue payments to the merchant via the card issuing bank computing device 417.

According to exemplary embodiments, receiving module 420 may be configured to receive, by the card issuing bank computing device 417, the authorized card transaction from the merchant computing device 415 via a card network between the merchant computing device 415 and the card issuing bank computing device 417. The card network may be a part of the communication network 410. According to exemplary embodiments, the executing module 434 may be configured to execute the data processing algorithm in real-time for the authorized card transaction. The implementing module 418 may be configured to implement a settlement data processing algorithm in real-time, in response to executing the data processing algorithm, wherein the settlement data processing algorithm settles the card transaction in real-time to issue payment to the merchant via the card issuing bank computing device 417.

Figure 5:
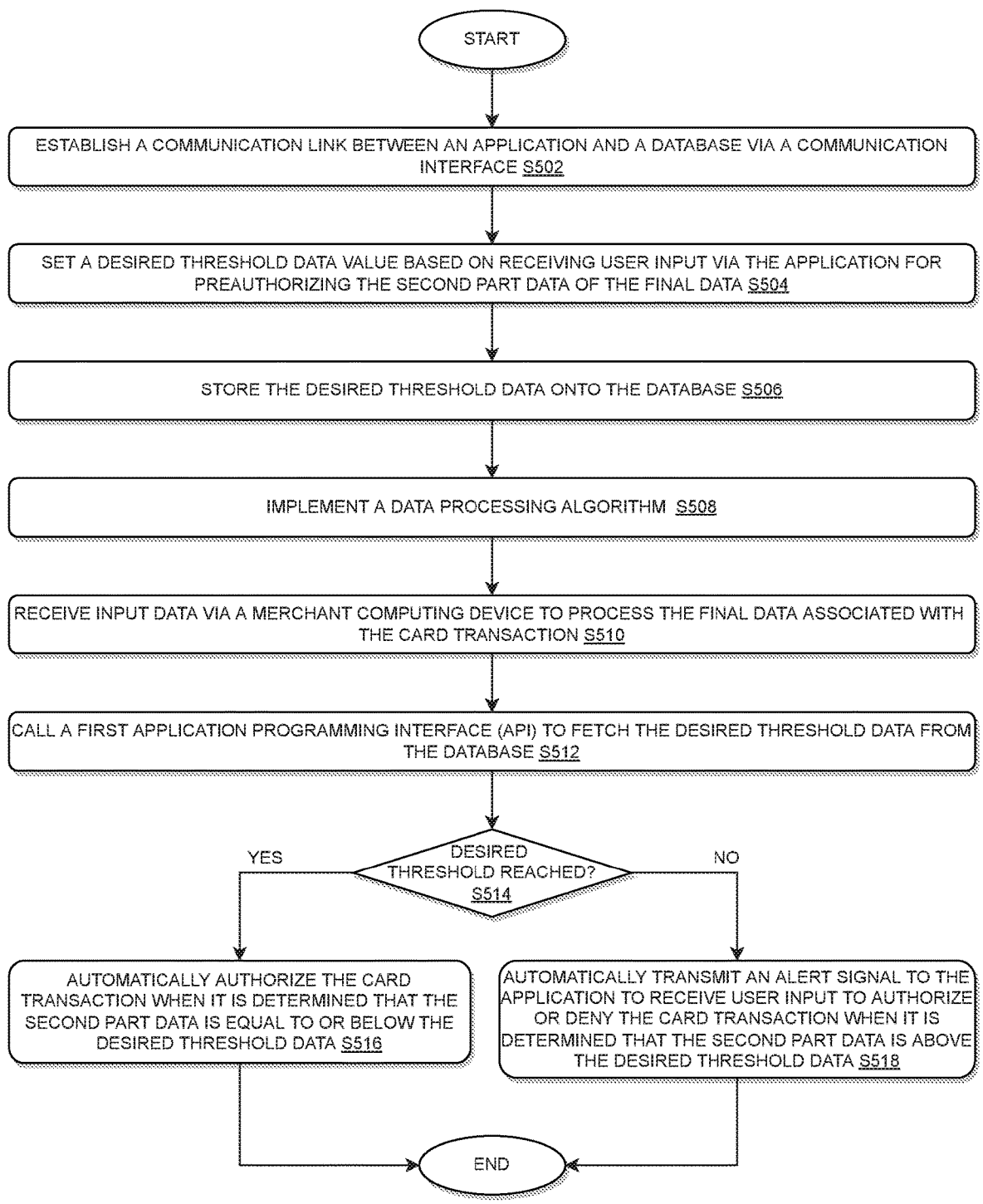
FIG. 5 illustrates an exemplary flow chart implemented by the platform and language agnostic smart data discrepancy detection module of FIG. 4 configured to automatically detect discrepancy between preset data and input data during data processing in accordance with an exemplary embodiment.

FIG. 5 illustrates a flow chart of a process 500 implemented by the platform and language agnostic SDDDM 406 of FIG. 4 configured to automatically detect discrepancy between preset data and input data during data processing in accordance with an exemplary embodiment. It will be appreciated that the illustrated process 500 and associated steps may be performed in a different order, with illustrated steps omitted, with additional steps added, or with a combination of reordered, combined, omitted, or additional steps.

As illustrated in FIG. 5, at step S502, the process 500 may include establishing a communication link between an application and a database via a communication interface, wherein the database stores user profile data, user history data in connection with a card transaction data, and wherein the card transaction data includes a final data that includes a first part data associated with rendering a service by a merchant to the user and a second part data that represents data that is voluntarily provided by the user in recognition of the rendered service.

At step S504, the process 500 may include setting a desired threshold data value based on receiving user input via the application for preauthorizing the second part data of the final data.

At step S506, the process 500 may include storing the desired threshold data onto the database.

At step S508, the process 500 may include implementing a data processing algorithm that includes steps the following steps S510, S512, S514, S516, and S518.

For example, at step S510, the process 500 may include receiving input data via a merchant computing device to process the final data associated with the card transaction. At step S512, the process 500 may include calling a first application programming interface (API) to fetch the desired threshold data from the database.

At step S514, the process 500 may include determining whether a desired threshold value is reached or not. In determining whether the desired threshold value is reached or not, the process 500 may include comparing the second part data of the final data with the desired threshold data. For example, when it is determined at step S514 that the second part data is equal to or below the desired threshold data, at step S516, the process 500 may include automatically authorizing the card transaction. When it is determined at step S514 that the second part data is above the desired threshold data, at step S518, the process 500 may include automatically transmitting an alert signal to the application to receive user input to authorize or deny the card transaction.

According to exemplary embodiments, in automatically transmitting the alert signal, the process 500 may further include: calling a second API; transmitting, in response to the second API, an electronic notification to the application indicating that the second part data exceeded the desired threshold data; and displaying the electronic notification onto a graphical user interface (GUI) to receive user input for denying or authorizing the card transaction.

According to exemplary embodiments, the process 500 may further include: receiving user input data via the application for declining the card transaction in response to the alert signal indicating that the second part data is above the desired threshold data.

According to exemplary embodiments, the process 500 may further include: receiving user input data via the application for authorizing the card transaction in response to the alert signal indicating that the second part data is above the desired threshold data; and storing the user input data onto the database indicating that the user authorized the second part data, although it exceeded the desired threshold data, for this particular card transaction with this particular merchant.

According to exemplary embodiments, the process 500 may further include: creating a machine learning model based on the user profile data and the user history data in connection with the card transaction data; and training the machine learning model with the user input data indicating that the user authorized the second part data, although it exceeded the desired threshold data, for this particular card transaction with this particular merchant.

According to exemplary embodiments, the process 500 may further include: receiving a second input data via the merchant computing device to process a second final data that includes the first part data and the second part data associated with a second card transaction involving this particular merchant; implementing the trained machine learning model; automatically authorizing, in response to implementing the trained machine learning model, the second card transaction although the second part data exceeded the desired threshold data; and retraining the machine learning model with transaction history data associated with the second card transaction.

According to exemplary embodiments, the process 500 may further include: receiving, by a card issuing bank computing device, a batch of authorized transactions from the merchant computing device for a plurality of card transactions associated with a plurality of users via a card network; executing the data processing algorithm for each authorized transaction of the batch of authorized transactions; and implementing a settlement data processing algorithm, in response to executing the data processing algorithm, wherein the settlement data processing algorithm settles the plurality of card transactions to issue payments to the merchant via the card issuing bank computing device.

According to exemplary embodiments, the process 500 may further include: receiving, by a card issuing bank computing device, the authorized card transaction from the merchant computing device via a card network; executing the data processing algorithm in real-time for the authorized card transaction; and implementing a settlement data processing algorithm in real-time, in response to executing the data processing algorithm, wherein the settlement data processing algorithm settles the card transaction in real-time to issue payment to the merchant via the card issuing bank computing device.

According to exemplary embodiments, the SDDDD 402 may include a memory (e.g., a memory 106 as illustrated in FIG. 1) which may be a non-transitory computer readable medium that may be configured to store instructions for implementing the SDDDM 406 for automatically detect discrepancy between preset data and input data (i.e., larger than the preset data) during data processing of a commercial transaction involving a gratuity, particularly when a credit card payment is being made, as disclosed herein. The SDDDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SDDDM 406, or within the SDDDD 402, may be used to perform one or more of the methods and processes as described herein. In a particular embodiment, the instructions may reside completely, or at least partially, within the memory 106, the medium reader 112, and/or the processor 104 (see FIG. 1) during execution by the SDDDD 402.

According to exemplary embodiments, the instructions, when executed, may cause a processor 104 embedded within the SDDDM 406 or the SDDDD 402 to perform the following: establishing a communication link between an application and a database via a communication interface, wherein the database stores user profile data, user history data in connection with a card transaction data, and wherein the card transaction data includes a final data that includes a first part data associated with rendering a service by a merchant to the user and a second part data that represents data that is voluntarily provided by the user in recognition of the rendered service; setting a desired threshold data value based on receiving user input via the application for preauthorizing the second part data of the final data; storing the desired threshold data onto the database; implementing a data processing algorithm that includes: receiving input data via a merchant computing device to process the final data associated with the card transaction; calling a first application programming interface (API) to fetch the desired threshold data from the database; comparing the second part data of the final data with the desired threshold data; automatically authorizing the card transaction when it is determined that the second part data is equal to or below the desired threshold data; and automatically transmitting an alert signal to the application to receive user input to authorize or deny the card transaction when it is determined that the second part data is above the desired threshold data.

According to exemplary embodiments, in automatically transmitting the alert signal, the instructions, when executed, may cause the processor 104 to further perform the following: calling a second API; transmitting, in response to the second API, an electronic notification to the application indicating that the second part data exceeded the desired threshold data; and displaying the electronic notification onto a graphical user interface (GUI) to receive user input for denying or authorizing the card transaction.

According to exemplary embodiments, the instructions, when executed, may cause the processor 104 to further perform the following: receiving user input data via the application for declining the card transaction in response to the alert signal indicating that the second part data is above the desired threshold data.

According to exemplary embodiments, the instructions, when executed, may cause the processor 104 to further perform the following: receiving user input data via the application for authorizing the card transaction in response to the alert signal indicating that the second part data is above the desired threshold data; and storing the user input data onto the database indicating that the user authorized the second part data, although it exceeded the desired threshold data, for this particular card transaction with this particular merchant.

According to exemplary embodiments, the instructions, when executed, may cause the processor 104 to further perform the following: creating a machine learning model based on the user profile data and the user history data in connection with the card transaction data; and training the machine learning model with the user input data indicating that the user authorized the second part data, although it exceeded the desired threshold data, for this particular card transaction with this particular merchant.

According to exemplary embodiments, the instructions, when executed, may cause the processor 104 to further perform the following: receiving a second input data via the merchant computing device to process a second final data that includes the first part data and the second part data associated with a second card transaction involving this particular merchant; implementing the trained machine learning model; automatically authorizing, in response to implementing the trained machine learning model, the second card transaction although the second part data exceeded the desired threshold data; and retraining the machine learning model with transaction history data associated with the second card transaction.

According to exemplary embodiments, the instructions, when executed, may cause the processor 104 to further perform the following: receiving, by a card issuing bank computing device, a batch of authorized transactions from the merchant computing device for a plurality of card transactions associated with a plurality of users via a card network; executing the data processing algorithm for each authorized transaction of the batch of authorized transactions; and implementing a settlement data processing algorithm, in response to executing the data processing algorithm, wherein the settlement data processing algorithm settles the plurality of card transactions to issue payments to the merchant via the card issuing bank computing device.

According to exemplary embodiments, the instructions, when executed, may cause the processor 104 to further perform the following: receiving, by a card issuing bank computing device, the authorized card transaction from the merchant computing device via a card network; executing the data processing algorithm in real-time for the authorized card transaction; and implementing a settlement data processing algorithm in real-time, in response to executing the data processing algorithm, wherein the settlement data processing algorithm settles the card transaction in real-time to issue payment to the merchant via the card issuing bank computing device.

According to exemplary embodiments as disclosed above in FIGS. 1-5, technical improvements effected by the SDDDM 406 of the instant disclosure may include automatically detecting discrepancy between preset data and input data (i.e., larger than the preset data) during data processing of a commercial transaction involving a gratuity, particularly when a credit card payment is being made, but the disclosure is not limited thereto. According to exemplary embodiments as disclosed above in FIGS. 1-5, technical improvements effected by the SDDDM 406 of the instant disclosure may include automatically altering the user when data discrepancy is detected, i.e., when the gratuity data is more than the preset gratuity data set by the user on the application.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically detecting data discrepancy during data processing by utilizing a system comprising one or more processors, one or more memories and a smart data discrepancy detection module (SDDDM) for automatically detect discrepancy between preset data and input data during data processing of card transactions involving gratuities, the method comprising steps performed by the system:

wherein the SDDDM includes a setting module, a storing module, an implementing module, a receiving module, a calling module, a comparing module, an authorizing module, a transmitting module, a creating module, a training module, and a communication module, wherein each module being called via corresponding Application Programming Interface (API);

establishing a communication link between an application of a client device of a user and a database via a communication interface by calling the communication module via a corresponding API of the communication module, wherein the database stores user profile data of the user, user history data of the user in connection with a card transaction data, and wherein the card transaction data includes a final data, wherein the final data includes a first part data associated with rendering a service by a merchant to the user and a second part data that represents gratuity data for the rendered service;

receiving, from the application of the client device via a corresponding API of the receiving module, a user request comprising a first user input for preauthorizing the second part data of the final data;

setting a desired threshold data value based on receiving the first user input from the application for preauthorizing the second part data of the final data by calling the setting module via a corresponding API of the setting module;

storing the desired threshold data onto the database by calling the storing module via a corresponding API of the storing module;

implementing a data processing algorithm by calling the implementing module via a corresponding API of the implementing module;

receiving, from a merchant computing device of the merchant via the corresponding API of the receiving module, a first merchant input data to process the final data associated with the card transaction, wherein the first merchant input data comprises the first part data and a first-second part data;

calling a first application programming interface (API) to fetch the desired threshold data from the database by utilizing the calling module, wherein calling the first API further comprises retrieving the desired threshold data from the database;

comparing the first-second part data of the final data with the desired threshold data by calling the comparing module via a corresponding API of the comparing module;

determining whether the first-second part data is equal, below or above the desired threshold data;

automatically transmitting an alert signal to the application to receive a second user input to authorize or deny the card transaction in response to determining that the first-second part data is above the desired threshold data by calling the transmitting module via a corresponding API of the transmitting module;

receiving, from the application via the corresponding API of the receiving module, the second user input data for authorizing the card transaction in response to transmitting the alert signal indicating that the first-second part data is above the desired threshold data;

storing the second user input data onto the database indicating that the user authorized the first-second part data for the card transaction with the merchant by calling the storing module via the corresponding API of the storing module;

creating a machine learning model based on the user profile data and the user history data in connection with the card transaction data by calling the creating module via a corresponding API of the creating module;

training the machine learning model with the second user input data indicating that the user authorized the first-second part data by calling the training module via a corresponding API of the training module;

receiving, from the merchant computing device via the corresponding API of the receiving module, a second merchant input data of a second card transaction to process a second final data, wherein the second final data includes a second-first part data and a second-second part data associated with the second card transaction involving the merchant by calling the receiving module via the corresponding API of the receiving module;

implementing the trained machine learning model by calling the implementing module via the corresponding API of the implementing module;

automatically authorizing, based on the trained machine learning model, the second card transaction by calling the authorizing module via a corresponding API of the authorizing module, wherein the second-second part data is above the desired threshold data; and retraining the machine learning model with transaction history data associated with the second card transaction by calling the training module via the corresponding API of the training module.

2. The method according to claim 1, wherein automatically transmitting the alert signal further comprises:
calling a second API;
transmitting, in response to calling the second API, an electronic notification to the application, wherein the electronic notification is an indication that the first-second part data exceeded the desired threshold data; and
displaying the electronic notification onto a graphical user interface (GUI) to receive the second user input for denying or authorizing the card transaction.

3. The method according to claim 1, wherein the first part data of the final data is a currency amount associated with rendering the service to the user and the second part data represents a percentage (%) amount of the currency amount of the first part data that is voluntarily provided by the user in recognition of the rendered service.

4. The method according to claim 3, wherein the desired threshold data is set to be 30% of the currency amount associated with the first part data.

5. The method according to claim 1, further comprising:
receiving, from the application, user input data for declining the card transaction in response to the alert signal indicating that the first-second part data is above the desired threshold data.

6. The method according to claim 1, further comprising:
receiving, by the system, a tach of authorized transactions, wherein a card issuing bank computing device receives the batch of authorized transactions from the merchant computing device for a plurality of card transactions associated with a plurality of users via a card network;
executing, by the system, the data processing algorithm for each authorized transaction of the batch of authorized transactions;
implementing, by the system, a settlement data processing algorithm, in response to executing the data processing algorithm, wherein the settlement data processing algorithm settles the plurality of card transactions to issue payments to the merchant via the card issuing bank computing device.

7. The method according to claim 1, further comprising:
receiving, by a card issuing bank computing device, the authorized card transaction from the merchant computing device via a card network;
executing, by the system, the data processing algorithm in real-time for the authorized card transaction; and
implementing, by the system, a settlement data processing algorithm in real-time, in response to executing the data processing algorithm, wherein the settlement data processing algorithm settles the card transaction in real-time to issue payment to the merchant via the card issuing bank computing device.

8. A system for automatically detecting data discrepancy during data processing, the system comprising:

a processor;
a memory; and
a smart data discrepancy detection module (SDDDM) for automatically detect discrepancy between preset data and input data during data processing of card transactions involving gratuities, and
wherein the memory operatively connected to the processor via a communication interface, the memory storing computer readable instructions, when executed by the processor, causes the processor to:
 wherein the SDDDM includes a setting module, a storing module, an implementing module, a receiving module, a calling module, a comparing module, an authorizing module, a transmitting module, a creating module, a training module, and a communication module, wherein each module being called via corresponding Application Programming Interface (API);
 establish a communication link between an application of a client device of a user and a database via a communication interface by calling the communication module via a corresponding API of the communication module, wherein the database stores user profile data of the user, user history data of the user in connection with a card transaction data, and wherein the card transaction data includes a final data, wherein the final data includes a first part data associated with rendering a service by a merchant to the user and a second part data that represents gratuity data for the rendered service;
 receive, from the application of the client device via a corresponding API of the receiving module, a user request comprising a first user input for preauthorizing the second part data of the final data;
 set a desired threshold data value based on receiving the first user input from the application for preauthorizing the second part data of the final data by calling the setting module via a corresponding API of the setting module;
 store the desired threshold data onto the database by calling the storing module via a corresponding API of the storing module;
 implement a data processing algorithm by calling the implementing module via a corresponding API of the implementing module;
 receive, from a merchant computing device of the merchant via the corresponding API of the receiving module, a first merchant input data to process the final data associated with the card transaction, wherein the first merchant input data comprises the first part data and a first-second part data;
 call a first application programming interface (API) to fetch the desired threshold data from the database by utilizing the calling module, wherein calling the first API further comprises retrieving the desired threshold data from the database;
 compare the first-second part data of the final data with the desired threshold data by calling the comparing module via a corresponding API of the comparing module;
 determine whether the first-second part data is equal, below or above the desired threshold data;
 automatically transmit an alert signal to the application to receive a second user input to authorize or deny the card transaction in response to determining that the first-second part data is above the desired threshold data by calling the transmitting module via the corresponding API of the transmitting module;
 receive, from the application via the corresponding API of the receiving module, the second user input data for authorizing the card transaction in response to transmitting the alert signal indicating that the first-second part data is above the desired threshold data;
 store the second user input data onto the database indicating that the user authorized the first-second part data for the card transaction with the merchant by calling the storing module via the corresponding API of the storing module;
 create a machine learning model based on the user profile data and the user history data in connection with the card transaction data by calling the creating module via a corresponding API of the creating module;
 train the machine learning model with the second user input data indicating that the user authorized the first-second part data by calling the training module via a corresponding API of the training module;
 receive, from the merchant computing device via the corresponding API of the receiving module, a second input data of a second card transaction to process a second final data, wherein the second final data includes a second-first part data a second-second part data associated with the second card transaction involving the merchant;
 implement the trained machine learning model by calling the implementing module via the corresponding API of the implementing module;
 automatically authorize, based on the trained machine learning model, the second card transaction by calling the authorizing module via a corresponding API of the authorizing module, wherein the second-second part data is above the desired threshold data; and
 retrain the machine learning model with transaction history data associated with the second card transaction by calling the training module via the corresponding API of the training module.

9. The system according to claim 8, wherein automatically transmitting the alert signal further comprises to:
 calling a second API;
 transmitting, in response to calling the second API, an electronic notification to the, wherein the electronic notification is an indication that the first-second part data exceeded the desired threshold data; and
 display the electronic notification onto a graphical user interface (GUI) to receive the second user input for denying or authorizing the card transaction.

10. The system according to claim 8, wherein the first part data of the final data is a currency amount associated with rendering the service to the user and the second part data represents a percentage (%) amount of the currency amount of the first part data that is voluntarily provided by the user in recognition of the rendered service.

11. The system according to claim 8, wherein the computer readable instructions, when executed by the processor, further cause the processor to:
 receive, from the application, user input data for declining the card transaction in response to the alert signal indicating that the first-second part data is above the desired threshold data.

12. The system according to claim 8, wherein the computer readable instructions, when executed by the processor, further cause the processor to:

receive a batch of authorized transactions, wherein a card issuing bank computing device receives the batch of authorized transactions from the merchant computing device for a plurality of card transactions associated with a plurality of users via a card network;

execute the data processing algorithm for each authorized transaction of the batch of authorized transactions; and implement a settlement data processing algorithm, in response to executing the data processing algorithm, wherein the settlement data processing algorithm settles the plurality of card transactions to issue payments to the merchant via the card issuing bank computing device.

13. The system according to claim 8, wherein the computer readable instructions, when executed by the processor, further cause the processor to:

receive the authorized card transaction, wherein a card issuing bank computing device receives the authorized card transaction from the merchant computing device via a card network;

execute the data processing algorithm in real-time for the authorized card transaction; and implement a settlement data processing algorithm in real-time, in response to executing the data processing algorithm, wherein the settlement data processing algorithm settles the card transaction in real-time to issue payment to the merchant via the card issuing bank computing device.

14. A non-transitory computer readable medium for automatically detecting data discrepancy during data processing, wherein the non-transitory computer readable medium stores instructions that, when executed by a processor of a system, cause the processor to perform the following steps of:

wherein the system further comprises a smart data discrepancy detection module (SDDDM) for automatically detect discrepancy between preset data and input data during data processing of card transactions involving gratuities, wherein the SDDDM includes a setting module, a storing module, an implementing module, a receiving module, a calling module, a comparing module, an authorizing module, a transmitting module, a creating module, a training module, and a communication module, wherein each module being called via corresponding Application Programming Interface (API);

establishing a communication link between an application of a client device of a user and a database via a communication interface by calling the communication module via a corresponding API of the communication module, wherein the database stores user profile data of the user, user history data of the user in connection with a card transaction data, and wherein the card transaction data includes a final data, wherein the final data includes a first part data associated with rendering a service by a merchant to the user and a second part data that represents gratuity data for the rendered service;

receiving, from the application of the client device via a corresponding API of the receiving module, a user request comprising a first user input for preauthorizing the second part data of the final data;

setting a desired threshold data value based on receiving the first user input from the application for preauthorizing the second part data of the final data by calling the setting module via a corresponding API of the setting module;

storing the desired threshold data onto the database by calling the storing module via a corresponding API of the storing module;

implementing a data processing algorithm by calling the implementing module via a corresponding API of the implementing module;

receiving, from a merchant computing device of the merchant via the corresponding API of the receiving module, a first merchant input data to process the final data associated with the card transaction, wherein the first merchant input data comprises the first part data and a first-second part data;

calling a first application programming interface (API) to fetch the desired threshold data from the database by utilizing the calling module, wherein calling the first API further comprises retrieving the desired threshold data from the database;

comparing the first-second part data of the final data with the desired threshold data by calling the comparing module via a corresponding API of the comparing module;

determining whether the first-second part data is equal, below or above the desired threshold data;

automatically transmitting an alert signal to the application to receive a second user input to authorize or deny the card transaction in response to determining that the first-second part data is above the desired threshold data by calling the transmitting module via a corresponding API of the receiving module;

receiving, from the application via the corresponding API of the receiving module, the second user input data for authorizing the card transaction in response to transmitting the alert signal indicating that the first-second part data is above the desired threshold data;

storing the second user input data onto the database indicating that the user authorized the first-second part data for the card transaction with the merchant by calling the storing module via the corresponding API of the storing module;

creating a machine learning model based on the user profile data and the user history data in connection with the card transaction data by calling the creating module via a corresponding API of the creating module;

training the machine learning model with the second user input data indicating that the user authorized the first-second part data by calling the training module via a corresponding API of the training module;

receiving, from the merchant computing device via the corresponding API of the receiving module, a second merchant input data of a second card transaction to process a second final data, wherein the second final data includes a second-first part data and a second-second part data associated with the second card transaction involving the merchant;

implementing the trained machine learning model by calling the implementing module via the corresponding API of the implementing module;

automatically authorizing, based on the trained machine learning model, the second card transaction by calling the authorizing module via a corresponding API of the authorizing module, wherein the second-second part data is above the desired threshold data; and retraining the machine learning model with transaction history data associated with the second card transaction by calling the training module via the corresponding API of the training module.

15. The non-transitory computer readable medium according to claim 14, wherein automatically transmitting the alert signal further comprises:

calling a second API;

transmitting, in response to calling the second API, an electronic notification to the application, wherein the electronic notification is an indication that the first-second part data exceeded the desired threshold data; and displaying the electronic notification onto a graphical user interface (GUI) to receive the second user input for denying or authorizing the card transaction.

16. The non-transitory computer readable medium according to claim 14, wherein the first part data of the final data is a currency amount associated with rendering the service to the user and the second part data represents a percentage (%) amount of the currency amount of the first part data that is voluntarily provided by the user in recognition of the rendered service.

17. The non-transitory computer readable medium according to claim 16, wherein the desired threshold data is set to be 30% of the currency amount associated with the first part data.

18. The non-transitory computer readable medium according to claim 14, wherein the instructions, when executed by the processor, further cause the processor to perform the following:

receiving user input data via the application for declining the card transaction in response to the alert signal indicating that the second part data is above the desired threshold data.

19. The non-transitory computer readable medium according to claim 14, wherein the instructions, when executed by the processor, further cause the processor to perform the following:

receiving a batch of authorized transactions, wherein a card issuing bank computing device receives the batch of authorized transactions from the merchant computing device for a plurality of card transactions associated with a plurality of users via a card network;

executing the data processing algorithm for each authorized transaction of the batch of authorized transactions; and implementing a settlement data processing algorithm, in response to executing the data processing algorithm, wherein the settlement data processing algorithm settles the plurality of card transactions to issue payments to the merchant via the card issuing bank computing device.

20. The non-transitory computer readable medium according to claim 14, wherein the instructions, when executed by the processor, further cause the processor to perform the following:

receiving the authorized card transaction, wherein a card issuing bank computing device receives the authorized card transaction from the merchant computing device via a card network;

executing the data processing algorithm in real-time for the authorized card transaction; and implementing a settlement data processing algorithm in real-time, in response to executing the data processing algorithm, wherein the settlement data processing algorithm settles the card transaction in real-time to issue payment to the merchant via the card issuing bank computing device.

\* \* \* \* \*